(12) United States Patent
Sassa et al.

(10) Patent No.: US 12,517,246 B2
(45) Date of Patent: Jan. 6, 2026

(54) OBJECT DETECTION DEVICE

(71) Applicants: AISIN CORPORATION, Kariya (JP); HONDA MOTOR CO., LTD., Tokyo (JP)

(72) Inventors: Koichi Sassa, Kariya (JP); Takuya Sakiuchi, Kariya (JP); Tatsuya Watanabe, Tokyo (JP); Kohei Toshima, Tokyo (JP)

(73) Assignees: AISIN CORPORATION, Kariya (JP); HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 18/566,421

(22) PCT Filed: Jun. 29, 2022

(86) PCT No.: PCT/JP2022/026080
§ 371 (c)(1),
(2) Date: Dec. 1, 2023

(87) PCT Pub. No.: WO2023/277097
PCT Pub. Date: Jan. 5, 2023

(65) Prior Publication Data
US 2024/0361453 A1    Oct. 31, 2024

(30) Foreign Application Priority Data
Jun. 30, 2021    (JP) .................. 2021-109444

(51) Int. Cl.
*G01S 15/931*    (2020.01)
*G01S 7/521*    (2006.01)

(52) U.S. Cl.
CPC ............ *G01S 15/931* (2013.01); *G01S 7/521* (2013.01)

(58) Field of Classification Search
None
See application file for complete search history.

(56) References Cited

U.S. PATENT DOCUMENTS

| 5,235,315 A * | 8/1993 | Cherry ................ G01S 7/52004 340/436 |
| 11,846,726 B2 * | 12/2023 | Chung ................. G01S 7/4876 |

(Continued)

FOREIGN PATENT DOCUMENTS

| JP | 2014085131 A | 5/2014 |
| JP | 2016031355 A | 3/2016 |

(Continued)

OTHER PUBLICATIONS

International Search Report (PCT/ISA/210) with English translation and Written Opinion (PCT/ISA/237) mailed on Sep. 6, 2022, by the Japanese Patent Office as the International Searching Authority for International Application No. PCT/JP2022/026080.

*Primary Examiner* — Fekadeselassie Girma
(74) *Attorney, Agent, or Firm* — BUCHANAN INGERSOLL & ROONEY PC

(57) ABSTRACT

An object detection device includes an acquisition module and a detection module. The acquisition module acquires a detection distance indicating a distance from a transmission/reception unit mounted on a vehicle to an object and a reception intensity indicating an intensity of a reflected wave received by the transmission/reception unit. The detection distance is detected based on results of transmission of a transmission wave by the transmission/reception unit and reception of the reflected wave from the object by the transmission/reception unit. The detection module detects a detection target among objects including the object based on the reception intensity exceeding an intensity threshold. The detection module increases the intensity threshold when the (Continued)

detection distance is a distance threshold or less and the detection target is detected.

2 Claims, 3 Drawing Sheets

(56) References Cited

U.S. PATENT DOCUMENTS

| | | | | |
|---|---|---|---|---|
| 2011/0148612 | A1* | 6/2011 | Nakazono | G01S 7/527 340/435 |
| 2018/0180732 | A1* | 6/2018 | Sestok, IV | G01S 15/36 |
| 2022/0260713 | A1* | 8/2022 | Tanemura | G05D 1/0255 |
| 2023/0367007 | A1* | 11/2023 | Sasaki | G01S 15/101 |

FOREIGN PATENT DOCUMENTS

| | | | |
|---|---|---|---|
| JP | 2016080639 | A | 5/2016 |
| JP | 6519115 | B2 | 5/2019 |
| JP | 2021089209 | A | 6/2021 |

* cited by examiner

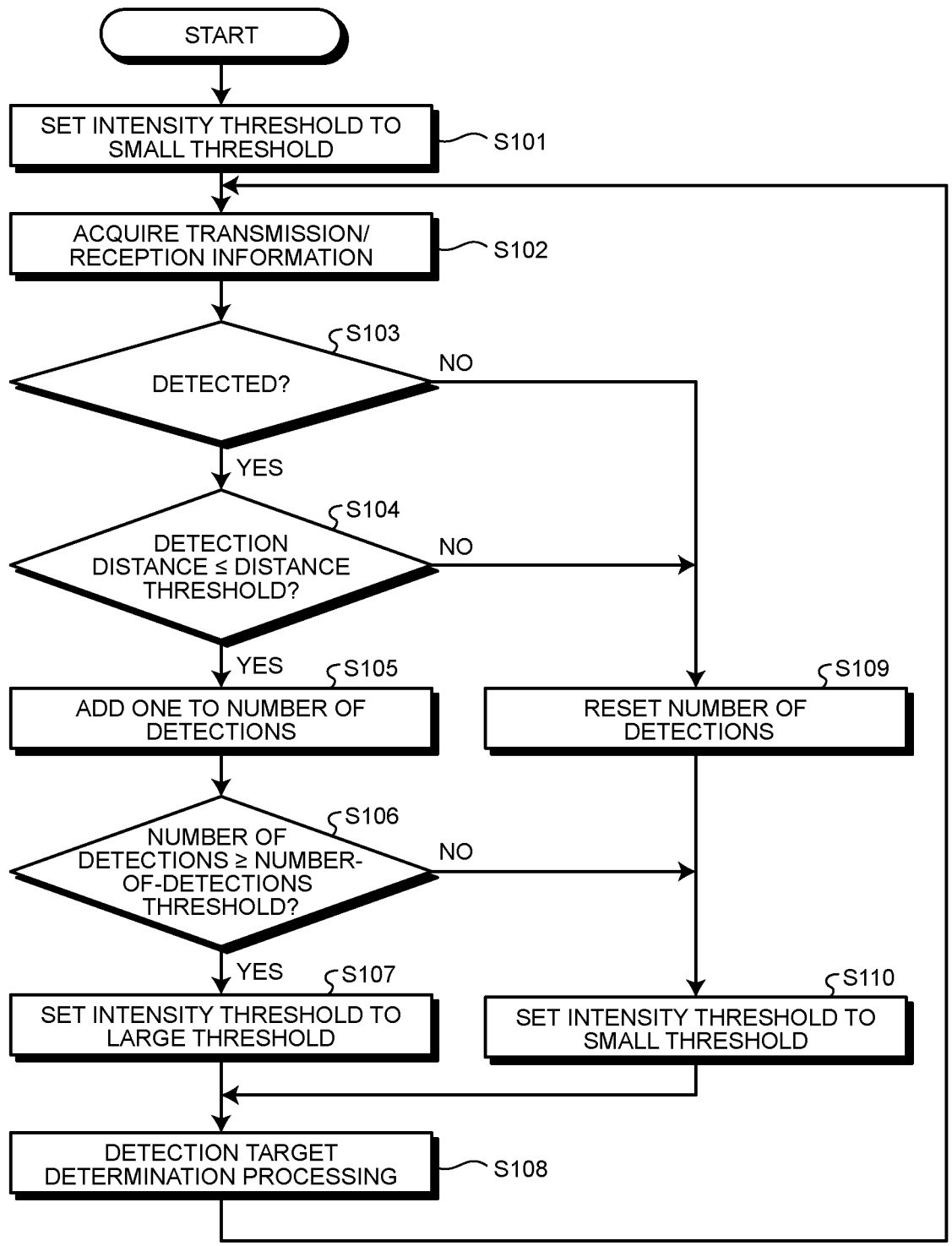

OBJECT DETECTION DEVICE

TECHNICAL FIELD

The present disclosure relates to an object detection device.

BACKGROUND ART

In the related art, there has been known an object detection device that detects a detection target among objects existing around a vehicle based on a result of transmission and reception of ultrasonic waves by an ultrasonic sensor mounted on the vehicle.

CITATION LIST

Patent Literature

Patent Document 1: JP 6519115 B

SUMMARY

Problem to be Solved

This type of object detection device is advantageous if the detection accuracy of the detection target can be improved.

One of the problems to be solved by the present disclosure is to improve detection accuracy of a detection target of an object detection device.

Means for Solving Problem

An object detection device according to one aspect of the present disclosure includes an acquisition module and a detection module. The acquisition module is configured to acquire a detection distance indicating a distance from a transmission/reception unit mounted on a vehicle to an object and a reception intensity indicating an intensity of a reflected wave received by the transmission/reception unit, the detection distance being detected based on results of transmission of a transmission wave by the transmission/reception unit and reception of the reflected wave from the object by the transmission/reception unit. The detection module is configured to detect a detection target among objects including the object based on the reception intensity exceeding an intensity threshold. The detection module is configured to increase the intensity threshold when the detection distance is a distance threshold or less and the detection target is detected.

According to such a configuration, for example, in a case where the detection distance is the distance threshold or less and the detection target is detected, the intensity threshold is increased, and thus the detection module can be prevented from erroneously detecting (misdetecting) an object other than the detection target as the detection target. Therefore, the detection accuracy of the detection target of the object detection device can be improved.

In the object detection device, for example, the detection module is configured to increase the intensity threshold when the detection distance is the distance threshold or less and a number of detections of the detection target after the number of detections of the detection target is added becomes a number-of-detections threshold or more.

According to such a configuration, for example, in a case where the detection distance is the distance threshold or less and the number of detections of the detection target after the number of detections of the detection target is added is the number-of-detections threshold or more, the intensity threshold is increased, and thus the detection module can be prevented from erroneously detecting (misdetecting) an object other than the detection target as the detection target. Therefore, the detection accuracy of the detection target of the object detection device can be improved.

In the object detection device, for example, the distance threshold is larger than an installation height indicating a height of the transmission/reception unit from a road surface.

According to such a configuration, it is possible to detect the detection target existing within the installation height of the transmission/reception unit from the transmission/reception unit at least around the vehicle.

BRIEF DESCRIPTION OF DRAWINGS

FIG. 5 is a flowchart illustrating an example of object detection processing performed by the object detection device according to the embodiment.

DESCRIPTION OF EMBODIMENTS

Hereinafter, embodiments of the present disclosure will be described with reference to the accompanying drawings. The configurations of the embodiments described below and the actions and effects brought about by the configurations are merely examples, and the disclosure here is not limited to the following description.

Figure 1:
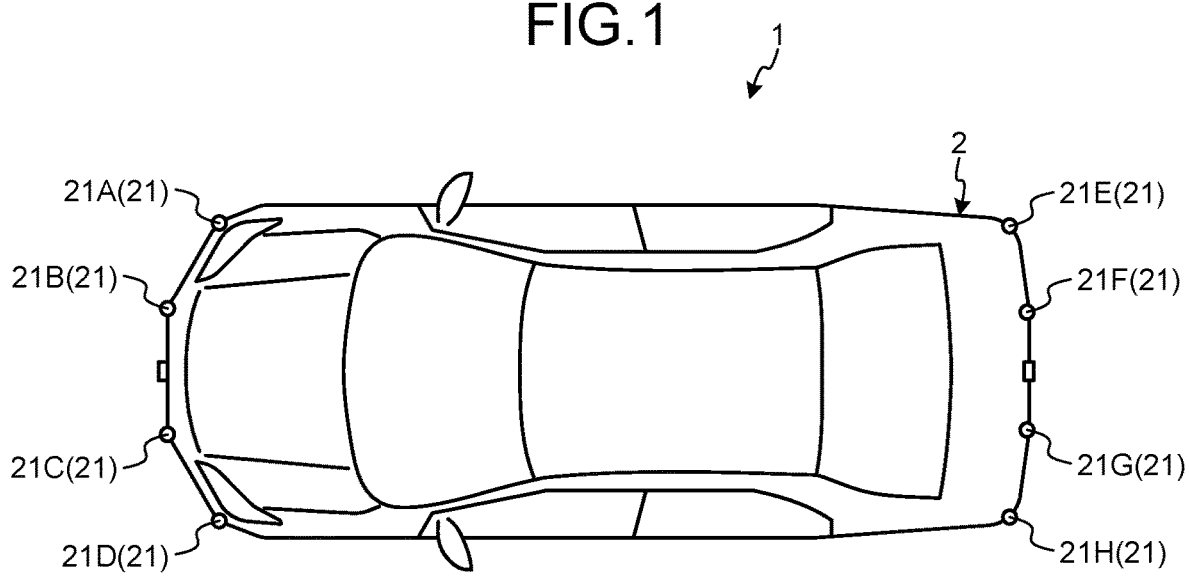
FIG. 1 is a top view illustrating an example of a configuration of a vehicle according to an embodiment.

FIG. 1 is a top view illustrating an example of a configuration of a vehicle 1 according to an embodiment. The vehicle 1 is an example of a vehicle (moving object) equipped with an object detection device according to the present embodiment. The object detection device according to the present embodiment is a device that detects an object (such as other vehicles, structures, and pedestrians) existing around the vehicle 1 based on time of flight (TOF), Doppler shift information, and the like acquired by transmitting an ultrasonic wave from the vehicle 1 and receiving a reflected wave from the object.

The object detection device according to the present embodiment includes a plurality of transmission/reception units 21A to 21H (hereinafter, the plurality of transmission/reception units 21A to 21H are abbreviated as the transmission/reception units 21 in a case where it is not necessary to distinguish the plurality of transmission/reception units 21A to 21H). Each of the transmission/reception units 21 is installed in a vehicle body 2 as an exterior of the vehicle 1, transmits an ultrasonic wave (transmission wave) toward the outside of the vehicle body 2, and receives a reflected wave from an object existing outside the vehicle body 2. In the example illustrated in FIG. 1, four transmission/reception units 21A to 21D are arranged at the front end portion of the vehicle body 2, and four transmission/reception units 21E to 21H are arranged at the rear end portion. Note that the number and installation positions of the transmission/reception units 21 are not limited to the above example.

Figure 2:
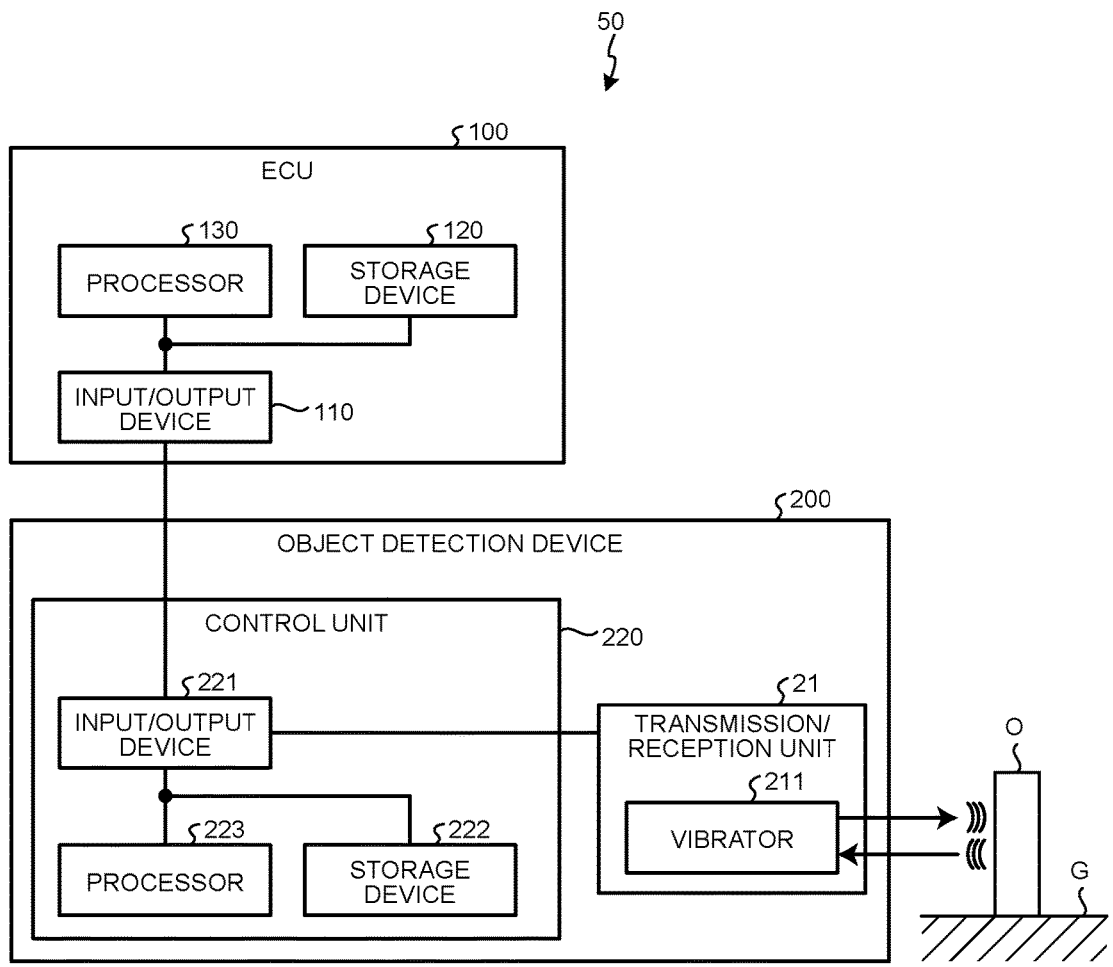
FIG. 2 is a block diagram illustrating an example of a configuration of a vehicle control device according to the embodiment.

FIG. 2 is a block diagram illustrating an example of a configuration of a vehicle control device 50 according to the embodiment. The vehicle control device 50 performs processing for controlling the vehicle 1 based on the information output from an object detection device 200. The vehicle control device 50 according to the present embodiment includes an ECU 100 and the object detection device 200.

The object detection device 200 includes the plurality of transmission/reception units 21 and a control unit 22. Each of the transmission/reception units 21 includes a vibrator 211 configured by using a piezoelectric element or the like, an amplifier, and the like and realizes transmission and reception of an ultrasonic wave by vibration of the vibrator 211. Specifically, each of the transmission/reception units 21 transmits an ultrasonic wave generated in response to the vibration of the vibrator 211 as a transmission wave and detects the vibration of the vibrator 211 caused by a reflected wave obtained by reflecting the transmission wave by an object O. The vibration of the vibrator 211 is converted into an electric signal, and the TOF corresponding to the distance from the transmission/reception unit 21 to the object O, the Doppler shift information corresponding to the relative speed of the object O, and the like can be acquired based on the electric signal.

The transmission/reception unit 21 according to the present embodiment transmits a transmission wave including an ultrasonic wave having directivity in a direction parallel or substantially parallel to the traveling direction of the vehicle 1. The transmission wave includes an ultrasonic wave (non-directional component) traveling vertically downward from the transmission/reception unit 21.

Note that, in the example illustrated in FIG. 2, a configuration in which both transmission of a transmission wave and reception of a reflected wave are performed using the single vibrator 211 is exemplified, but the configuration of the transmission/reception unit 21 is not limited thereto. For example, like a configuration in which a vibrator for transmitting a transmission wave and a vibrator for receiving a reflected wave are separately provided, a configuration in which the transmission side and the reception side are separated is possible.

A control unit 220 includes an input/output device 221, a storage device 222, and a processor 223. The input/output device 221 is an interface device for realizing transmission and reception of information between the control unit 220 and the outside (transmission/reception unit 21, ECU 100, and the like). The storage device 222 includes a main storage device such as a read only memory (ROM) and a random access memory (RAM), and an auxiliary storage device such as a hard disk drive (HDD) and a solid state drive (SSD). The processor 223 is an integrated circuit that executes various processes for realizing the functions of the control unit 220 and includes, for example, a central processing unit (CPU) that operates according to a program and an application specific integrated circuit (ASIC) designed for a specific application. The processor 223 executes various arithmetic processing and control processing by reading and executing a program stored in the storage device 222.

The ECU 100 is a unit that executes various types of processing for controlling the vehicle 1 based on various types of information acquired from the object detection device 200 and the like. The ECU 100 includes an input/output device 110, a storage device 120, and a processor 130. The input/output device 110 is an interface device for realizing transmission and reception of information between the ECU 100 and an external mechanism (such as the object detection device 200, a drive mechanism, a braking mechanism, a steering mechanism, a transmission mechanism, an in-vehicle display, and a speaker). The storage device 120 includes a main storage device such as a ROM and a RAM, and an auxiliary storage device such as an HDD and an SSD. The processor 130 is an integrated circuit that executes various processing for realizing the functions of the ECU 100 and includes, for example, a CPU, and an ASIC. The processor 130 executes various arithmetic processing and control processing by reading a program stored in the storage device 120.

Figure 3:
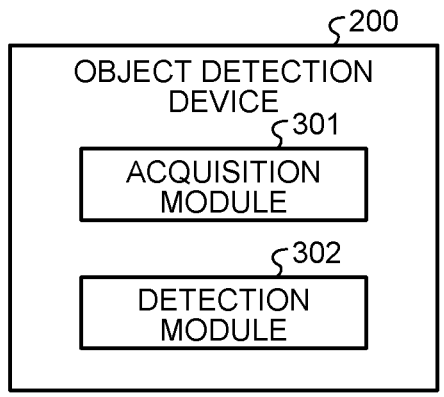
FIG. 3 is a block diagram illustrating an example of a functional configuration of an object detection device according to the embodiment.

FIG. 3 is a block diagram illustrating an example of a functional configuration of the object detection device 200 according to the embodiment. The object detection device 200 according to the present embodiment includes an acquisition module 301 and a detection module 302. These functional components 301 and 302 are realized by cooperation of hardware components of the object detection device 200 as illustrated in FIG. 2 and software components such as firmware and a program.

The acquisition module 301 acquires various types of information. For example, the acquisition module 301 processes data acquired by the transmission/reception unit 21 and generates various types of information. The acquisition module 301 executes, for example, amplification processing, filter processing, line processing, and the like on the electric signal corresponding to the vibration of the vibrator 211, and generates echo information indicating a temporal change in the intensity (amplitude value) of the reflected wave transmitted by the transmission/reception unit 21 and reflected by the object O. The intensity of the reflected wave is the intensity of the reflected wave received by the transmission/reception unit 21. The amplitude value of the reflected wave is an example of the intensity of the reflected wave. The intensity of the reflected wave received by the transmission/reception unit 21 is also referred to as reception intensity. The acquisition module 301 detects TOF corresponding to the object O existing around the vehicle 1 based on the echo information and calculates, that is, acquires a detection distance which is a distance from the transmission/reception unit 21 (vehicle body 2) to the object O.

Figure 4:
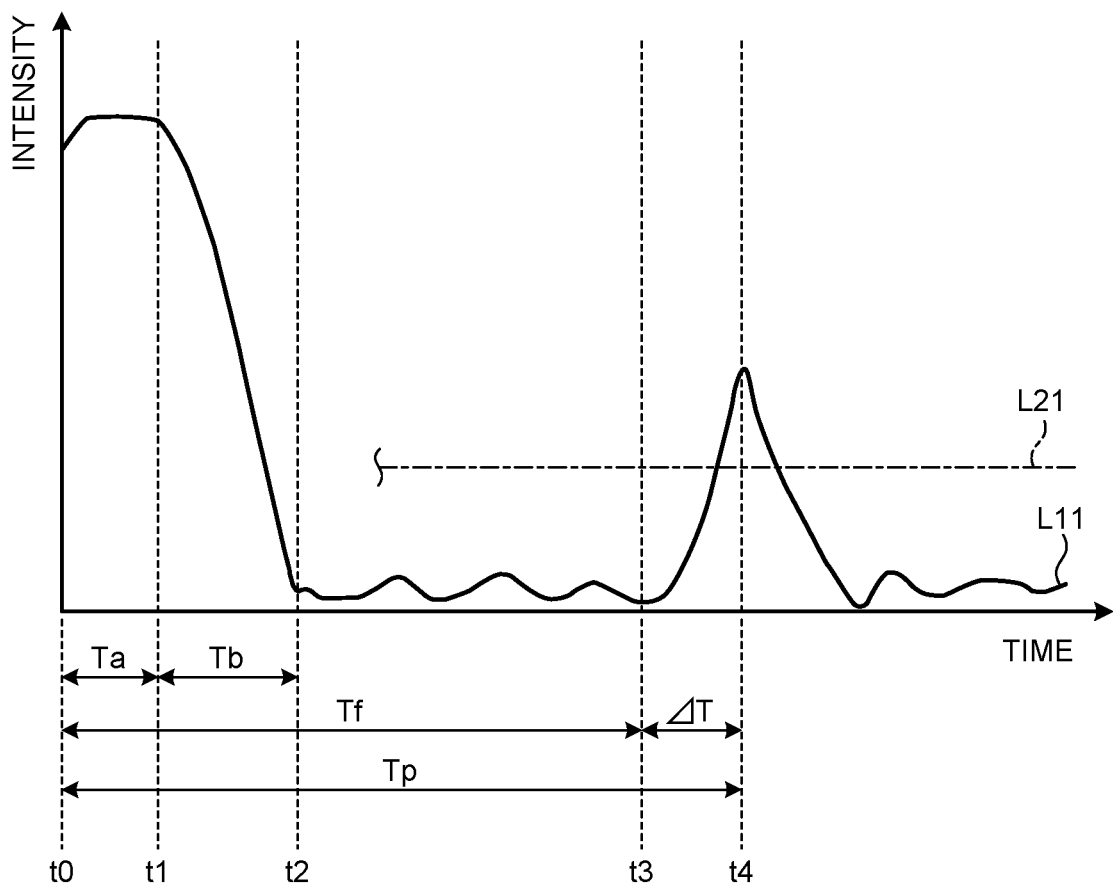
FIG. 4 is a diagram illustrating an envelope curve for describing an outline of an object detection method using a TOF according to the embodiment.

FIG. 4 is a diagram illustrating an envelope curve for describing an outline of an object detection method using a TOF according to the embodiment. FIG. 4 illustrates an envelope curve as echo information indicating a temporal change in intensity of an ultrasonic wave transmitted and received by the transmission/reception unit 21. In the bluff illustrated in FIG. 4, the horizontal axis corresponds to time (TOF), and the vertical axis corresponds to the intensity of the ultrasonic wave transmitted and received by the transmission/reception unit 21.

A solid line L11 represents an example of an envelope curve indicating a temporal change in intensity indicating the magnitude of vibration of the vibrator 211. From the solid line L11, it can be read that the vibrator 211 is driven and vibrates from a timing to for a period of time Ta, the transmission of the transmission wave is completed at a timing t1, and then the vibration of the vibrator 211 due to inertia continues while being attenuated for a period of time Tb until a timing t2. Therefore, in the graph illustrated in FIG. 4, the period of time Tb corresponds to so-called reverberation time.

In the solid line L11, the magnitude of the vibration of the vibrator 211 reaches a peak that exceeds (or becomes equal to or greater than) a predetermined intensity threshold (threshold) indicated by an alternate long and short dash line L21 at a timing t4 after a period of time Tp elapses from the timing to at which the transmission of the transmission wave is started. The intensity threshold is a value that is preset to identify whether the vibration of the vibrator 211 is caused by reception of a reflected wave from the object as the detection target or caused by reception of a reflected wave from an object other than the detection target. Here, the intensity threshold indicated by the alternate long and short dash line L21 is illustrated as a constant value, but the intensity threshold is a variable value that changes, as described in detail below. The intensity threshold is also referred to as an amplitude threshold. Also, the detection target is also referred to as an obstacle.

The vibration having the peak exceeding (or equal to or greater than) the intensity threshold indicated by the alternate long and short dash line L21 can be regarded as being caused by the reception of the reflected wave from the object O as the detection target. Meanwhile, vibration having a peak equal to or less than (or less than) the intensity threshold can be regarded as being caused by reception of a reflected wave from the object O other than the detection target. Therefore, from the solid line L11, it can be read that the vibration of the vibrator 211 at the timing t4 is caused by the reception of the reflected wave from the object O as the detection target.

In the solid line L11, the vibration of the vibrator 211 is attenuated after the timing t4. Therefore, the timing t4 corresponds to the timing at which the reception of the reflected wave from the object O as the detection target is completed, in other words, the timing at which the transmission wave transmitted at the last at the timing t1 returns as a reflected wave.

Furthermore, in the solid line L11, the timing t3 as the start point of the peak at the timing t4 corresponds to the timing at which reception of the reflected wave from the object O as the detection target starts, in other words, the timing at which the transmission wave transmitted at first at the timing to returns as a reflected wave. Therefore, a period of time ΔT between the timing t3 and the timing t4 is equal to the period of time Ta as the transmission time of the transmission wave.

In view of the above, in order to obtain the distance to the object O by using the TOF, it is necessary to obtain a period of time Tf between the timing to at which the transmission wave starts to be transmitted and the timing t3 at which the reflected wave starts to be received. The period of time Tf can be obtained by subtracting the period of time ΔT equal to the period of time Ta as the transmission time of the transmission wave from the period of time Tp as the difference between the timing to and the timing t4 at which the intensity of the reflected wave exceeds the threshold and reaches the peak.

The timing to at which the transmission wave starts to be transmitted can be easily specified as the timing at which the object detection device 200 starts the operation, and the period of time Ta as the transmission time of the transmission wave is determined in advance by a setting or the like. Therefore, the distance to the object O as the detection target can be obtained by specifying the timing t4 at which the intensity of the reflected wave exceeds the threshold and reaches the peak.

As described above, the acquisition module 301 acquires the detection distance indicating the distance from the transmission/reception unit 21 to the object O detected based on the result of the repeated transmission of the transmission wave by the transmission/reception unit 21 mounted on the vehicle 1 and the reception of the reflected wave from the object O by the transmission/reception unit 21. In addition, the acquisition module 301 acquires the reception intensity indicating the intensity of the reflected wave received by the transmission/reception unit 21. The detection distance and the reception intensity configure transmission/reception information. That is, the transmission/reception information includes the detection distance and the reception intensity.

The detection module 302 detects the detection target among the objects O based on the reception intensity exceeding the intensity threshold. When the detection distance is the distance threshold or less, and the detection target is detected, the detection module 302 increases the intensity threshold. For example, when the detection distance is the distance threshold or less, and the number of detections of the detection target (hereinafter, also referred to as the number of detections) is the number-of-detections threshold or more, the detection module 302 increases the intensity threshold. For example, when the detection distance is the distance threshold or less, the number of detections of the detection target is added, and then the number of detections of the detection target is the number-of-detections threshold or more, the detection module 302 increases the intensity threshold. That is, the detection module 302 increases the intensity threshold when the number of detections of the object O within a predetermined distance from the transmission/reception unit 21 exceeds a predetermined number of times. In this manner, the detection module 302 dynamically corrects the intensity threshold. The intensity threshold includes, for example, two values, and the two values are alternatively selected. The two values are a small threshold and a large threshold. The small threshold is less than the large threshold. In other words, the large threshold is greater than the small threshold. The values of the small threshold and the large threshold may be set in advance. In addition, one of the small threshold and the large threshold may be used as a reference, and the other may be determined by a ratio with respect to the reference. For example, when the large threshold is the reference, the small threshold is set to a predetermined ratio with respect to the large threshold. As an example, the small threshold is 60% of the large threshold. Note that the ratio of the small threshold to the large threshold may be other than 60%. The distance threshold is, for example, a preset fixed value. As an example, the distance threshold is larger than an installation height indicating the height of the transmission/reception unit 21 from a road surface G. The installation height indicates the height of the transmission/reception unit 21 from the road surface G in the vehicle 1 in a predetermined state and is a preset fixed value. The vehicle 1 in the predetermined state may be, for example, in a state in which no occupant is on board or a state in which occupants of the capacity are on board. Note that the intensity threshold and the distance threshold are not limited to the above.

Next, object detection processing (object detection method) executed by the object detection device 200 is described with reference to FIG. 5. FIG. 5 is a flowchart illustrating an example of the object detection processing performed by the object detection device 200 according to the embodiment.

As illustrated in FIG. 5, the detection module 302 sets the intensity threshold to a small threshold (S101). Accordingly, transmission of transmission and reception of reflected waves by the transmission/reception unit 21 are performed.

Next, the acquisition module 301 acquires, from the transmission/reception unit 21, transmission/reception information based on transmission of a transmission wave and reception of a reflected wave by the transmission/reception unit 21 (S102). As described above, the transmission/reception information includes the detection distance and the reception intensity.

Next, the detection module 302 determines whether the detection target (confirmation candidate) is detected among the objects O based on the reception intensity of the transmission/reception information (S103). Here, the detection module 302 detects the object O of which the reception intensity exceeds an intensity threshold as a detection target. Therefore, when the reception intensity exceeds the intensity threshold, the detection module 302 determines that the detection target is detected (S103: Yes) and proceeds to S104. Meanwhile, when the reception intensity is the intensity threshold or less, the detection module 302 determines that the detection target is not detected (S103: No) and proceeds to S109.

In S104, the detection module 302 determines whether the detection distance included in the transmission/reception information is a distance threshold or less. When the detection module 302 determines that the detection distance included in the transmission/reception information is the distance threshold or less (S104: Yes), the processing proceeds to S105. Meanwhile, when the detection module 302 determines that the detection distance included in the transmission/reception information is not the distance threshold or less, that is, the detection distance included in the transmission/reception information is larger than the distance threshold (S104: No), the processing proceeds to S109.

In S105, the detection module 302 adds one to the number of detections in a counter area provided in the storage device 120. Here, the counter area provided in the storage device 120 is an area that stores the number of detections of the detection target (hereinafter, also referred to as the number of detections). The counter area is also referred to as a number-of-time storage unit.

Next, the detection module 302 determines whether the number of detections stored in the counter area is the number-of-detections threshold or more (S106). Here, the number-of-detections threshold is, for example, a fixed value and is two as an example. Note that the number-of-detections threshold may be other than two. When the detection module 302 determines that the number of detections stored in the counter area is the number-of-detections threshold or more (S106: Yes), the processing proceeds to S107. Meanwhile, when the detection module 302 determines that the number of detections stored in the counter area is not the number-of-detections threshold or more, that is, the number of detections stored in the counter area is less than the number-of-detections threshold (S106: No), the processing proceeds to S110.

In S107, the detection module 302 sets the intensity threshold to the large threshold. Thereafter, the detection module 302 proceeds to S108.

In S108, the detection module 302 performs detection target determination processing. Specifically, the detection module 302 determines whether the number of detections stored in the counter area is a confirmation threshold or more. The confirmation threshold is a threshold larger than the number-of-detections threshold and is three as an example. Note that the confirmation threshold also may be other than three. When determining that the number of detections stored in the counter area is the confirmation threshold or more, the detection module 302 confirms that the object O is the detection target. Meanwhile, when determining that the number of detections stored in the counter area is not the confirmation threshold or more, that is, the number of detections stored in the counter area is less than the confirmation threshold, the detection module 302 does not confirm that the object O is the detection target. The method of determining whether the object O is the detection target (confirmation method) is not limited to the above.

When confirming that the object O is the detection target, the detection module 302 transmits confirmation information indicating that the object O is confirmed to be the detection target to the ECU 100. When receiving the confirmation information, the ECU 100 executes predetermined processing. The predetermined processing is alarm processing of issuing an alarm by an in-vehicle display or a speaker, braking processing of braking the vehicle 1 by a braking mechanism, or the like.

In S109, the detection module 302 resets the number of detections stored in the counter area. That is, the detection module 302 sets the number of detections stored in the counter area to 0.

Also, in S110, the detection module 302 sets the intensity threshold to the small threshold.

As described above, when the detection distance is the distance threshold or less (S104: Yes), and the number of detections of the detection target is the number-of-detections threshold or more (S106: Yes), the detection module 302 increases the intensity threshold.

When the detection target is not detected (S103: No), and when the detection distance is not the distance threshold or more (S104: No), the detection module 302 resets the number of detections (S109), sets the intensity threshold to the small threshold (S110) and then executes the processing of S108. In this case, in S108, since the number of detections is reset, that is, 0, the number of detections stored in the counter area is not the confirmation threshold or more. Therefore, in this case, the detection module 302 does not confirm that the object O is the detection target in S108.

When the number of detections is not the number-of-detections threshold or more (S106: No), the detection module 302 sets the intensity threshold to the small threshold (S110) and then executes the processing of S108. In this case, since the number of detections is not the number-of-detections threshold or more, the number of detections is not the confirmation threshold or more. Therefore, in this case, the detection module 302 does not confirm that the object O is the detection target in S108.

As described above, in the present embodiment, the object detection device 200 includes the acquisition module 301 and the detection module 302. The acquisition module 301 acquires the detection distance indicating the distance from the transmission/reception unit 21 to the object O detected based on the results of the repeated transmission of the transmission wave by the transmission/reception unit 21 mounted on the vehicle 1 and the reception of the reflected wave from the object O by the transmission/reception unit 21, and the reception intensity indicating the intensity of the reflected wave received by the transmission/reception unit 21. The detection module 302 detects the detection target among the objects O based on the reception intensity exceeding the intensity threshold. When the detection distance is the distance threshold or less, and the number of detections of the detection target is the number-of-detections threshold or more, the detection module 302 increases the intensity threshold.

According to such a configuration, for example, in a case where the detection distance is the distance threshold or less, and the number of detections of the detection target becomes the number-of-detections threshold or more, the intensity threshold is increased, and thus, it is possible to prevent the detection module 302 from erroneously detecting (misdetecting) the object O other than the detection target as the detection target. Therefore, the detection accuracy of the detection target of the object detection device 200 can be improved. For example, at the time of determination to confirm that the object O is the detection target, since the intensity threshold is high, the detection module 302 is prevented from erroneously detecting (misdetecting) the object O other than the detection target as the detection target. Therefore, for example, erroneous detection of the road surface G that is not the detection target as the detection target is suppressed. Therefore, occurrence of an erroneous alarm due to misdetection and an erroneous operation of the braking mechanism is suppressed.

According to the above configuration, when the detection distance is more than the distance threshold, the intensity threshold is lowered. Therefore, for example, even a reflected wave from the object O having weak reflection far away from the vehicle 1 is likely to exceed the threshold. Therefore, for example, even the object O having weak reflection that is far away from the vehicle 1 can be detected, and the detection distance can be calculated.

Also, the distance threshold is larger than an installation height indicating the height of the transmission/reception unit 21 from the road surface G.

According to such a configuration, it is possible to detect the object O as the detection target existing within the installation height of the transmission/reception unit 21 from the transmission/reception unit 21 at least around the vehicle 1.

A program for causing a computer (for example, the processor 223 of the control unit 220 and the processor 130 of the ECU 100) to execute processing for realizing various functions in the above embodiments can be provided by being recorded in a computer-readable recording medium such as a compact disc (CD)-ROM, a flexible disk (FD), a CD-R (Recordable), and a digital versatile disk (DVD) as a file in an installable format or an executable format. Furthermore, the program may be provided or distributed via a network such as the Internet.

The detection module 302 in the above embodiment is configured to increase the intensity threshold when the detection distance is the distance threshold or less, and the number of detections of the detection target is the number-of-detections threshold or less, but the disclosure here is not limited thereto. The detection module 302 may be configured to increase the intensity threshold when the detection distance is the distance threshold or less, and the number of detections of the detection target is added.

Although the embodiments of the present disclosure are described above, the above-described embodiments and modifications thereof are merely examples and are not intended to limit the scope of the disclosure. The novel embodiments described above and modifications can be implemented in various other forms, and various omissions, substitutions, and changes can be made without departing from the gist of the disclosure. These embodiments and modifications thereof are included in the scope and gist of the disclosure and are encompassed by the claims and the equivalent scope thereof.

EXPLANATIONS OF LETTERS OR NUMERALS

1 VEHICLE
21, 21A to 21H TRANSMISSION/RECEPTION UNIT
200 OBJECT DETECTION DEVICE
301 ACQUISITION MODULE
302 DETECTION MODULE
G ROAD SURFACE
O OBJECT

The invention claimed is:

1. An object detection device comprising:
an acquisition module configured to acquire a detection distance indicating a distance from a transmission/reception unit mounted on a vehicle to an object and a reception intensity indicating an intensity of a reflected wave received by the transmission/reception unit, the detection distance being detected based on results of transmission of a transmission wave by the transmission/reception unit and reception of the reflected wave from the object by the transmission/reception unit; and
a detection module configured to detect a detection target among objects including the object based on the reception intensity exceeding an intensity threshold, wherein the detection module is configured to increase the intensity threshold when the detection distance is a distance threshold or less and a number of detections of the detection target after the number of detections of the detection target is added becomes a number-of-detections threshold or more.

2. The object detection device according to claim 1, wherein the distance threshold is larger than an installation height indicating a height of the transmission/reception unit from a road surface.

* * * * *